Jan. 29, 1963 D. H. GIESKIENG 3,075,756
CONTROL SYSTEM FOR AUTOMATICALLY REGULATING
CEMENT KILNS AND AUXILIARY APPARATUS
Filed March 16, 1961 3 Sheets-Sheet 1
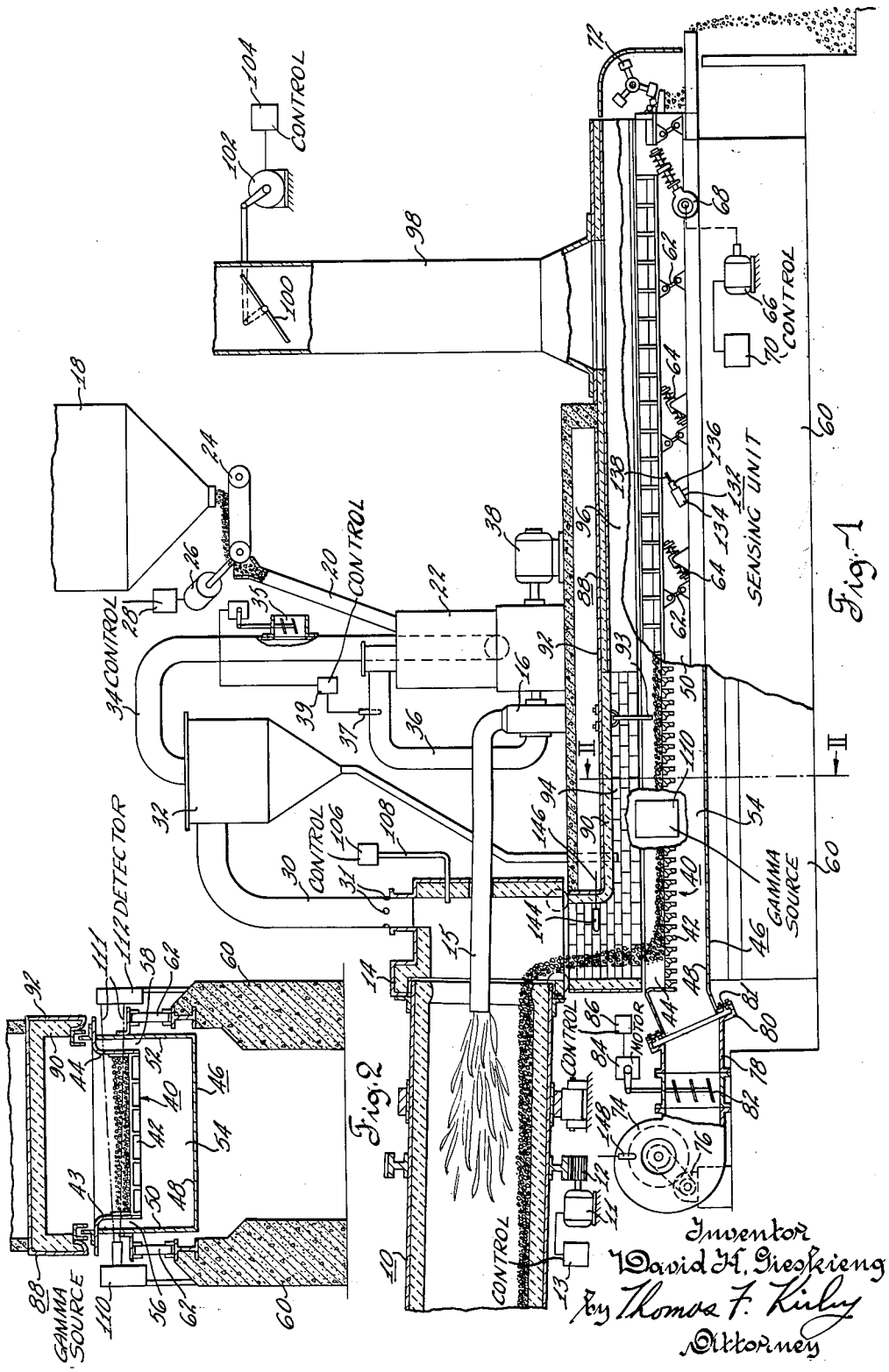
Inventor
David H. Gieskieng
By Thomas F. Kirby
Attorney Jan. 29, 1963

D. H. GIESKIENG 3,075,756

CONTROL SYSTEM FOR AUTOMATICALLY REGULATING
CEMENT KILNS AND AUXILIARY APPARATUS

Filed March 16, 1961

Inventor
David H. Gieskieng
By Thomas F. Kirby
Attorney

Jan. 29, 1963  D. H. GIESKIENG  3,075,756
CONTROL SYSTEM FOR AUTOMATICALLY REGULATING
CEMENT KILNS AND AUXILIARY APPARATUS
Filed March 16, 1961  3 Sheets-Sheet 3

Inventor
David H. Gieskieng
By Thomas F. Kirby
Attorney

United States Patent Office 3,075,756
Patented Jan. 29, 1963

3,075,756
CONTROL SYSTEM FOR AUTOMATICALLY REGULATING CEMENT KILNS AND AUXILIARY APPARATUS
David H. Gieskieng, West Allis, Wis., assignor to Allis-Chalmers Manufacturing Company, Milwaukee, Wis.
Filed Mar. 16, 1961, Ser. No. 96,255
16 Claims. (Cl. 263—32)

The present invention relates generally to means for automatically controlling and regulating the operation of cement kilns and auxiliary apparatus.

A typical cement manufacturing installation, for example, comprises an inclined rotary kiln having its lower discharge end enclosed within a firing hood. A heat source or kiln burner extending through the firing hood, utilizing fuel and primary combustion air, fires the kiln from the discharge end of the latter. A clinker cooler conveyor having a perforated grate and a wind box beneath the grate extends underneath the firing hood so that its receiving end is below the discharge end of the kiln.

A finely ground mixture comprising a natural carrier of $CaCO_3$ such as limestone, natural carriers of $SiO_2$ and $Al_2O_3$ such as clay or shale, and $Fe_2O_3$ in the form of hematite or mill scale, is introduced in the form of a dry raw mix or a wet slurry into the elevated end of the kiln and due to the kiln's rotation and inclination is transported toward the lower discharge end. Flame from the kiln burner is introduced into the discharge end of the kiln and this flame and its hot combustion by-products are drawn through the kiln countercurrent to the flow of the charge therein; heating the charge in the process. As the charge progresses, its temperature is first raised to a level which drives off moisture. Then it progresses to a hotter general area in the kiln known as the calcining zone where temperatures are sufficient to disassociate the $CaCO_3$ (limestone) into CaO and $CO_2$. It then progresses to the hottest zone where CaO combines with $SiO_2$ to form cement clinker.

The hot cement clinker eventually is discharged by gravity onto the receiving end of the perforated grate of the clinker cooler conveyor to form a moving bed of hot clinker thereon. Cooling or quenching air from a cooler blower is supplied to the wind box beneath the grate and is forced through the perforated grate and through the bed of hot clinker thereon to enhance its quality as cement and to embrittle it for subsequent grinding. Some of the quenching air thus heated is vented through a waste air stack but, to improve thermal efficiency of kiln operation, the hottest air is directed into the firing hood where it enters the kiln as secondary combustion air to supplement the primary combustion air. Some of the heated air may be withdrawn from the firing hood to be used later to supplement the supply of primary air.

The chemical reactions taking place in the kiln, especially in the calcining zone, are complex and critical and determine the quality of the cement produced.

It is important that the reactions taking place in the calcining zone, namely, the endothermic disassociation of $CaCO_3$ and CaO and $CO_2$ be carried to completion before the material is elevated to the temperature where the exothermic combination of $SiO_2$ and CaO occur. Otherwise, residual traces of $CaCO_3$ would then endothermically disassociate causing localized cooling and preventing some of the CaO and $SiO_2$ from reaching the critical reaction temperature necessary for their combination. This would reslult in a residuum of incompletely combined particles of calcium and silica, the presence of free lime, etc. Since the calcium-silica reaction is exothermic, it will be realized that clinker resulting from complete calcination and burning will be hotter than clinker wherein the reaction was not completed. Properly burned clinker will also generally be more dense than improperly burned clinker.

In view of these reactions, proper balance must be maintained between all variable factors of kiln operation. For example, kiln feed rate may be varied to regulate the amount of charge in the kiln. Rotational speed of the kiln may be varied to vary the length of time the charge remains in the kiln. Temperature within the kiln may also be varied by varying the amount of fuel being supplied to the burner. In this regard it is to be noted that the amount of primary air supplied is usually maintained constant and that the amount of secondary air supplied is adjusted by kiln draft to balance the fuel to air ratio. However, as regards secondary air, though the cooler blower supplying it usually runs at constant speed, the quantity being supplied through the cooler to the firing hood is regulated by dampers which are controlled by devices responsive to pressure in the firing hood; it being desired that the firing hood pressure remain essentially at the same pressure as the ambient air to limit ingress of ambient air through various firing hood openings or escape of dusty secondary air. The temperature of the secondary air is largely determined by the temperature and quantity of hot clinker on the cooler conveyor, and in order to maintain stable temperature it is desirable that a constant bed of clinker be maintained on the cooler conveyor.

In many installations, a running check on clinker quality is made by removing a sample of clinker from the discharge end of the cooler and weighing one liter of it to determine its "liter weight" or bulk density. As explained hereinbefore, properly burned clinker is generally heavier per unit volume than that which was improperly prepared and burned at one or more stages in the kiln and the liter weight is thereby somewhat indicative of the extent of chemical reactions that have taken place in the kiln; assuming the blending and chemistry of the feed are constant. If the liter weight test so indicates, the kiln operator may make one or more adjustments in the operation of the kiln and its auxiliary apparatus, as by changing the rotational speed of the kiln or by varying the heat supplied thereto by regulating the amount of fuel supplied to the burner. However, due to the fact that the discharge end of the cooler conveyor is quite distant from the discharge end of the kiln, liter weight sampling indicates kiln conditions which existed more or less a half hour prior to the actual sampling, and any adjustments based on such sampling must also be predicated to some degree on the kiln operator's judgment, based on experience, as to actual conditions in the kiln at the time the adjustment is made. As a result, uniform quality control and maximum efficiency have not thus far been obtainable in kiln operation. It is desirable that a control system be provided whereby constant measurement of clinker quality can be ascertained and necessary adjustments in the operation of the kiln and its auxiliary apparatus automatically take place to insure uniform production of high quality clinker and efficient operation of the apparatus.

Prior attempts to overcome the aforementioned problems through the use of various control instruments and systems have not met with complete success because of certain inherent limitations in instruments heretofore available and because of the nature of the chemical reactions involved, the high temperatures encountered, and other adverse environmental conditions in the kiln and cooler conveyor, such as dust and smoke.

Accordingly, it is an object of this invention to provide improved condition responsive control systems for automatically and continuously sensing a number of variable operating conditions in kilns and their auxiliary apparatus, for automatically relating these variables to each other, and for immediately introducing corrections where appropriate in their functioning in order to maintain continuous production of high quality clinker and efficient operation of kilns.

A more specific object of the invention is to provide a system wherein means are employed to sense the depth of the bed of clinker on the cooler conveyer and to maintain an optimum depth of bed despite variations in kiln output, wherein means are employed to sense the speed and stroke of the conveyer to give an indication and signal of kiln discharge rate since bed depth and width are being maintained constant, wherein means are employed to sense the temperature of the air after it has cooled the clinker to give an indication in the form of an electric signal of the heat release sustaining ability of a known amount of clinker, and wherein means are employed to relate these two signals automatically to provide a third output signal which represents a parameter of the liter weight of the clinker being produced by the kiln and which may be employed to regulate kiln speed, fuel rate or any combination thereof.

Another object is to provide improved electrical control systems of the aforesaid character which include means for continuously indicating the amount of clinker being delivered from the kiln, since transport rate through the kiln may be irregular due to formation of rings, accumulation and discharge of material.

Another object is to provide improved electrical control systems of the aforesaid character which include means for continuously calculating a liter weight parameter of the clinker immediately upon leaving the kiln.

Other objects and advantages of the invention will hereinafter appear.

The accompanying drawings illustrate several preferred embodiments of the invention but it is to be understood that the embodiments disclosed herein are susceptible to modifications with respect to details thereof without departing from the scope of the appended claims.

In the drawings:

FIG. 1 is a side elevational view, partly in section, of a cement kiln and cooler conveyer assembly embodying the invention;

FIG. 2 is an enlarged cross sectional view of the cooler conveyer assembly taken along the line II—II of FIG. 1;

Figure 3:
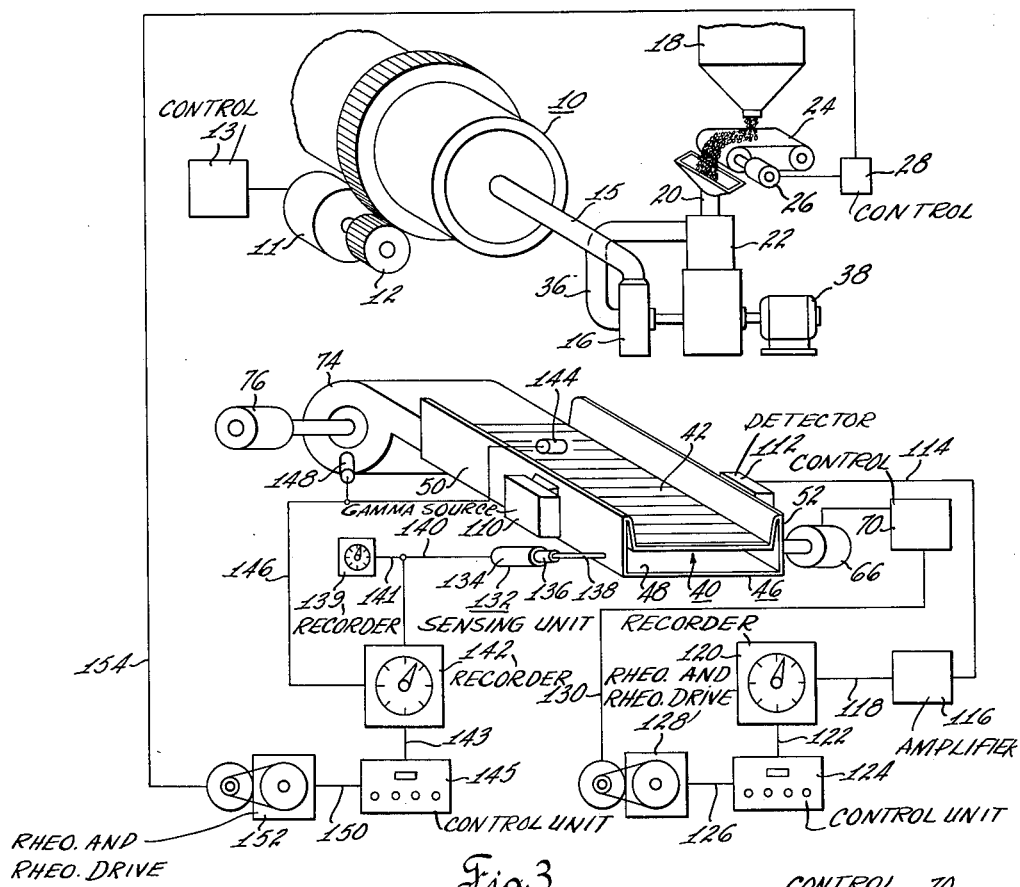
FIG. 3 is a schematic view of a control system for the kiln and cooler conveyer assembly shown in FIGS. 1 and 2.

Referring to FIG. 1, the numeral 10 designates a kiln which is supported for rotation about a slightly inclined axis. Kiln 10 is adapted to be rotated at a desired speed by suitable means such as a motor 11 which is mechanically connected thereto by means of a suitable driving linkage comprising gears 12. Motor 11 is provided with means such as a controller 13 for regulating the speed thereof. The kiln is refractory lined and adapted to deliver a hot granular material, such as cement clinker, by gravity from the discharge end thereof. A firing hood 14 is positioned over the discharge end of the kiln and has a bottom opening through which clinker discharged from the kiln may pass.

Kiln 10 is fired by means of a burner arrangement which produces a flame which is directed into the kiln from the discharge end thereof to effect the desired heat treatment of the raw materials therein to convert them into cement clinker. The burner arrangement includes a nozzle 15 which extends through firing hood 14 and through which a combustible mixture of fluent fuel such as powdered coal and primary combustion air is delivered by means of a blower 16.

The coal is supplied from a coal bin 18 through a pipe 20 to a coal grinding mill 22 by means of a coal feeder 24 which is driven by means of a motor 26 having means such as a controller 28 for regulating the speed thereof. The amount of coal being supplied to mill 22 is controlled by regulating the speed of motor 26.

The primary combustion air could be obtained directly from the atmosphere but in the present case is understood to be obtained in preheated condition from firing hood 14 at a temperature, for example, of about 1400° F.; being drawn therefrom through a pipe 30, through a dust collector 32 wherein it is cleaned, and through a pipe 34 to coal mill 22 by the suction of blower 16. Pipe 30 and pipe 34 are provided with means such as air bleed in holes 31 and a damper 35, respectively, which are adapted to permit ingress of ambient air to reduce the temperature of the extremely hot air in the pipes to a suitable temperature, for example, 600° F., for use in the coal mill operation. Damper 35 is provided with a thermocouple 37 and a control 39 which regulate the damper to maintain constant temperature of the air in pipe 36 to account for variations in coal moisture and variations in firing rate. Temperature of the air in pipe 36 is maintained, for example, at about 190° F. As will hereinafter appear, the heated air drawn from firing hood 14 is excess quenching air, not utilized as secondary combustion air, which is supplied to the firing hood from a wind box 46, hereinafter described. Blower 16 also draws the mixture of pulverized coal and entraining heated primary combustion air from grinding mill 22 through a pipe 36 and supplies it to nozzle 15.

Coal grinding mill 22 and blower 16 are both driven by suitable means such as a motor 38 which is adapted, usually, to operate at constant speed.

A clinker cooler conveyer 40 is positioned horizontally below the level of the bottom opening of firing hood 14 and has its receiving end disposed beneath the latter. As FIGS. 1 and 2 show, conveyer 40 comprises a perforate support or grate 42 which is fabricated of crossbars which are spaced a small distance apart from each other, for example, one sixteenth of an inch, to accommodate the upward flow of cooling or quenching air. Grate 42 is adapted to receive hot clinker from kiln 10 thereon and to advance it therealong in the form of a moving bed. Grate 42 is rigidly attached to and suspended within a wind box 46 by means which include longitudinally extending side plates 43 and 44. Wind box 46 comprises an imperforate floor portion 48 and side walls 50 and 52.

Wind box 46 is of sufficient width and depth so that grate 42 and its attached side plates 43 and 44 are spaced, respectively, from floor portion 48 and side walls 50 and 52 of the wind box. This arrangement provides an air duct 54 below grate 42 and longitudinally extending spaces 56 and 58 between the side plates 43 and 44 and the side walls 50 and 52, respectively, of wind box 46.

Wind box 46 in which the grate is mounted is supported for reciprocating movement on stationary foundation members 60 by means of a Ferraris type suspension which includes rearwardly inclined links 62 attached to the foundation members and the wind box. The links 62 are prevented from collapsing by opposed coil spring assemblies 64 which also control the reciprocation of wind box 46. Reciprocating motion is imparted to the wind box and grate by means such as a motor 66 and a spring coupled eccentric member 68, shown in FIG. 1, attached to the wind box and driven by motor 66. Motor 66 is provided with means such as a controller 70 for regulating the speed thereof. Regulation of the speed of motor 66 regulates the frequency of reciprocation and the length of reciprocating stroke of wind box 46 and grate 42 and thus affects the speed at which the bed of clinker is moved along the grate. When the conveyer is in operation, wind box 46 and the grate mounted therein move together with a short backward and forward motion with a slight rise on the forward stroke which conveys the material in a stream; the direction of advancement of the stream being away from the discharge end of the kiln. Preferably, the wind box has a total travel of approximately three-quarters of an inch at a rate of about 280 strokes per minute but this frequency and consequent stroke is variable as will hereinafter appear. Hot material from kiln 10, such as cement clinker, falls directly on grate 42 and forms a moving bed of clinker which is continuously discharged at the discharge end thereof into a hammer mill 72 which reduces oversize pieces of clinker to a size suitable for succeeding grinding operations.

Since grate 42 and wind box 46 are rigidly connected and vibrate as a unit, the fine material falling through the grate and collecting on floor portion 48 of the wind box is advanced simultaneously with the coarser clinker on the grate above, joining it at the discharge end of the cooler.

Cooling or quenching air is forced into the wind box by a blower 74 which is driven by a motor 76 which normally operates at constant speed. Blower 74 is provided with a discharge pipe 78 which is connected to wind box 46 near the receiving end of grate 42. Since blower 74 and discharge pipe 78 are stationarily mounted, a connection 80, which includes a flexible diaphragm 81, is provided to permit movement of wind box 46 relative thereto. An adjustable louver damper 82 is provided in discharge pipe 78 to regulate the quantity of cooling air being supplied to wind box 46. Suitable means are provided to adjust louver damper 82 and such means take the form of a motor 84 and its controller 86.

A stationary hood or arch 88 for collecting air directed upwardly through grate 42 and the moving bed of clinker thereon is arranged above wind box 46 in which the grate is mounted. The arch is suitably supported on a frame structure and comprises a refractory portion 90 and a sheet metal portion 92. The arch may be provided with means such as a baffle member 93 to assist in partially channeling the cooling air from beneath grate 42 into two chambers 94 and 96 above the grate. Refractory portion 90 of arch 88 is joined to firing hood 14 and provides a passage for the flow of secondary air from chamber 94 to kiln 10. The arch is also provided with a stack 98 which communicates with chamber 96 of the arch to provide a passage for the flow of excess air to the atmosphere as its temperature is usually too low for further use. Stack 98 is provided with means such as an adjustable stack damper 100 to regulate the amount of air leaving the stack. Suitable means are provided to adjust damper 100 and such means take the form of a motor 102 and its controller 104.

As noted hereinbefore, it is desirable that secondary air pressure in firing hood 14 be maintained balanced with respect to ambient air outside of the hood. In practice, this is accomplished by regulation of louver damper 82 and stack damper 100, both of which are hereinbefore described, and in some installations these dampers are regulated together by means such as an automatic controller 106 which responds to a signal from means such as a pressure sampling pipe 108 located in firing hood 14.

In the operation of the kiln, the kiln is charged with suitable quantities of finely ground and blended limestone, natural carriers of $SiO_2$ and $Al_2O_3$ such as clay or shale, and natural carriers of $Fe_2O_3$ such as hematite or mill scale. As the charge advances through the kiln and is burned, the chemical reactions hereinbefore described take place and the raw material is converted into hot cement clinker.

The hot cement clinker formed in the kiln is discharged therefrom at a temperature, for example, of about 2400° F. through the bottom opening of firing hood 14 onto the receiving end of grate 42. The vibrational movement of grate 42 results in a conveying action which causes the clinker deposited thereon to be formed into a moving bed which advances toward the discharge end thereof. The speed and amplitude of vibration determines the depth of the bed of clinker on grate 42 and the depth averages, for example, about four inches.

Air for cooling the clinker on grate 42 is supplied by blower 74. Damper 82 is adjusted to regulate the total amount of cooling air being supplied. A portion of the cooling air is directed through the hottest section of the bed and thence into firing hood 14. Another portion of the cooling air is directed through the more advanced portion of the bed and thence through stack 98. Most of the air entering firing hood 14 is utilized as secondary combustion air and part is withdrawn by blower 16 and utilized as primary air.

As mentioned hereinbefore, the temperature of the secondary air is largely determined by the temperature and quantity of hot clinker moving along grate 42 of the clinker cooler conveyer 40, and in order to stabilize secondary air temperature, it is desirable that a constant bed of clinker be maintained on the grate despite variations of kiln output. Since width of the bed is a predetermined constant established by the transverse dimension of grate 42, a constant bed can be maintained by providing means which sense the clinker bed as a function of depth and density. (Subsequently, the depth and density condition will be referred to only as depth.) Such means, as disclosed herein, take the form of means for sensing the depth of the bed, for establishing when bed depth departs from a predetermined desired value and for regulating the speed of the clinker cooler conveyer to bring bed depth back to the predetermined desired condition.

Thus, as FIGS. 1, 2 and 3 show, in accordance with the present invention a gamma radiation source 110 is mounted outside of side wall 50 of wind box 46 and is adapted to project a beam of radiation, indicated by the dotted lines 111, transversely through the wind box and through and over the bed of clinker on grate 42 toward a gamma radiation detector 112 which is mounted outside of side wall 52 of wind box 46 directly across from the radiation source. A gamma radiation source designated as the model LS–102, manufactured by Industrial Nucleonics Corporation of Columbus, Ohio, and described in their publication entitled "Instruction Manual— Continuous Level Measuring System," Manual No. B–C–S–11455, April, 1960 is an example of a radiation source such as gamma radiation source 110 described hereinbefore. A gamma radiation detector designated as the model LD–104–C, described in the aforesaid publication, is an example of a radiation detector such as gamma radiation detector 112 described hereinbefore. The amount of gamma radiation from source 110 which impinges on radiation detector 112 depends on the depth and density of the clinker on grate 42. Radiation detector 112 is adapted to respond to the amount of radiation impinging thereon to generate an electrical output signal which is inversely proportional thereto. As FIG. 3 shows, radiation detector 112 is connected by a cable 114 to a signal amplifier 116, which is adapted to amplify the electrical output signal from the radiation detector to useful magnitude. An amplifier designated as the model LA–101–C, described in the aforesaid publication of the Industrial Nucleonics Corporation is an example of an amplifier such as amplifier 116 described hereinbefore. Signal amplifier 116 is connected by a cable 118 to a recorder device 120, hereinafter described, and the amplified signal is transmitted through cable 118 to recorder device 120.

Recorder device 120 is understood to be a commercially available type of potentiometric instrument which is adapted to receive, measure, indicate and record an electrical output signal from a condition responsive element, such as a radiation detector and amplifier, or any other element which produces a related electrical output signal. Furthermore, recorder device 120 is adapted to be preset so that it generates an output signal for control purposes whenever the input signal from the condition responsive element indicates a departure from a predetermined value. This output signal from recorder device 120 is available for use in a control unit 124 hereinafter described.

A recorder device designated as a Speedomax H, manufactured by the Leeds & Northrup Company of Philadelphia, Pennsylvania, and described in their publication entitled "Manual for Speedomax H," No. 077990, issue 5, is an example of an instrument such as the recorder device 120 described hereinbefore. "Speedomax" is a registered trademark of the Leeds & Northrup Company.

Recorder device 120 is connected by a cable 122 to control unit 124, hereinbefore referred to and the latter is connected through a cable 126 to a combination rheostat and rheostat drive unit 128. Combination rheostat and rheostat drive 128 is connected by a cable 130 to controller 70 for cooler drive motor 66.

The output signal from recorder device 120 is transmitted to control unit 124 wherein it is translated into a form useful to operate combination unit 128 to cause positioning of the rheostat of the latter unit thereby effecting, through controller 70, changes in the speed of motor 66 which reciprocates cooler conveyer 40.

A control unit designated as the "Series 60 Control-Position Adjusting Type Control Unit," manufactured by the aforesaid Leeds & Northrup Company and described in their publication entitled "Series 60 Control Using 3-Action P.A.T. Control Unit," No. 077992, issue 4, is an example of an instrument such as control unit 124 described hereinbefore.

In practice, the rheostat of combination unit 128, hereinbefore described, is usually connected in circuit with the field windings of drive motor 66 if the latter is a D.C. motor.

The control system thus far described maintains a substantially constant bed of hot clinker on grate 42 despite variations in kiln output in the following manner. If, for example, it is desired to maintain a bed depth of four inches, control derivative feature of recorder device 120 is set to provide signals corresponding to deviations from this value. As long as radiation detector 112 indicates that the four inch depth is being maintained, recorder device 120 generates no output. However, deviation in either direction from the desired bed depth causes an appropriate output signal to be sent to control unit 124 which in turn causes rotation of the rheostat of combination unit 128 in the appropriate direction to either increase or decrease the speed of motor 66. Thus, if bed depth begins to diminish, conveyer 40 slows down, but if bed depth begins to increase, the conveyer speeds up until bed depth is reduced to predetermined bed depth.

As hereinbefore explained, since bed width is a known value and since bed depth can be maintained at a constant known value by means of the control system thus far described, it follows that the rate at which kiln 10 is producing clinker can be determined by ascertaining the rate of speed at which the clinker bed on grate 42 is moving. As hereinafter will appear, the information as to rate of kiln production, besides being useful in its own right, can be combined with temperature information to relate the heat release sustaining ability of the clinker being produced and thereby afford an indication as to the thoroughness of the clinkering operation.

The means for ascertaining the rate of speed at which the clinker bed on gate 42 is moving, the means for ascertaining the heat release sustaining ability of the clinker, and the means for combining and utilizing this information are hereinafter described.

FIGS. 1 and 3 show that in accordance with the present invention, means are provided to ascertain the speed of the moving bed of clinker on grate 42. Such means include a well known type of sensing unit 132 which is adapted to translate the frequency of reciprocation and length of each reciprocating stroke of cooler conveyer 40 into an electrical signal which represents the speed of the moving bed of clinker on grate 42. Sensing unit 132 comprises, for example, an induction coil 134 which is rigidly mounted on the stationary members 60 supporting cooler conveyer 40 and further comprises a permanent magnet 136 which is relatively movable with respect to the induction coil. Permanent magnet 136 is connected to and movable with a member or plunger 138 which is secured to and movable with movable wind box 46 of cooler conveyor 40. Reciprocating movement of wind box 46 effects reciprocating movement of magnet 136 with respect to induction coil 134 of sensing unit 132 and in this manner the induction coil generates an electrical signal having an intensity which depends on the length of stroke and frequency of oscillation of the wind box, i.e., signal intensity depends on the number of magnetic flux lines cut and the rate at which they are cut. Since coil 134 produces an alternating current output signal, means (not shown) are provided within sensing unit 132 to rectify and filter the signal for use in direct current measuring and control circuits.

Figures 4, 5:
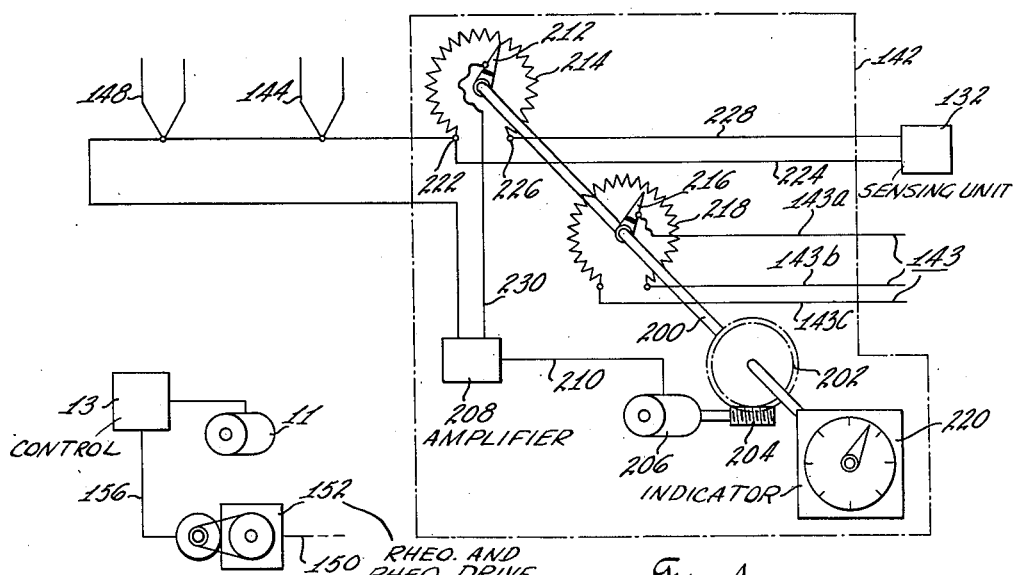
FIG. 4 is a schematic view of certain circuit components shown in FIG. 3.

Sensing unit 132 is connected by means of a cable 140 to a recording device 142 which, it is to be understood, is similar to recording device 120 hereinbefore described but is modified as hereinafter explained in connection with FIG. 4 so as to provide a null signal on the ratio of two input signals rather than on the basis of comparison of one input signal to a standard reference voltage. The rectified output signal from sensing unit 132 is supplied by cable 140, which FIG. 4 shows comprises lead wires 224 and 228, to an instrument balance slidewire 214 in recording device 142. Recording device 142 is connected by a cable 143 to a control unit 145 which is understood to be identical to control unit 124 hereinbefore described.

As hereinbefore explained, the rectified output signal from sensing unit 132, besides being an indication of the rate of speed at which the clinker bed on grate 42 is being conveyed, represents the amount of clinker being discharged from kiln 10 since the width and depth of the clinker bed are known, predetermined values which remain substantially constant. Accordingly, means are provided to translate the output signal from sensing unit 132 into a form which, for a known depth of bed, indicates the rate of clinker discharge from kiln 10. As FIG. 3 shows, such means are, for example, an indicator and recorder device 139 which is connected by a cable 141 to cable 140. It is to be understood, for example, that recorder device 139 is similar to recorder device 120 hereinbefore described and that it is provided with indicating means for providing information as to kiln output in terms, for example, of barrels or tons per hour.

FIGS. 1 and 3 show that in further accordance with the present invention, means are provided for ascertaining the secondary air temperature, sometimes referred to as cooler overgrate temperature and for combining this information with information as to the rate of production of kiln 10 to provide a signal representing a liter weight parameter.

Such means as shown herein comprise a thermocouple 144, which, as FIG. 1 shows, is located on the inside wall of arch 88 and is adapted to sense the temperature of heated quenching air to which it is exposed and generate an electrical output signal approximately proportional thereto. Thermocouple 144 is connected by a cable 146 to recorder device 142 hereinbefore referred to and the latter device is adapted to receive the signal from thermocouple 144 as the variable reference voltage against which the kiln discharge rate signal from sensing unit 132 is proportioned. If preferred, a thermocouple 148 located near the air intake of undergrate blower 74 may be connected in series circuit with thermocouple 144 to afford ambient temperature compensation for variations in temperature of the air being supplied to blower 74 since the clinker heat test is more accurately expressed in terms of secondary air temperature above ambient.

The signal from thermocouple 144 represents not merely secondary air temperature but in combination with the kiln discharge rate signal from sensing unit 132 represents the heat content of a known amount of clinker. As explained hereinbefore, clinker which was properly treated in kiln 10 is denser and hotter than improperly treated clinker and the former will have a greater heat release sustaining ability than the latter in the presence of a coolant or cooling influence, i.e., quenching air. Thus, secondary air temperatures associated with a known quantity of clinker are an index to the density or liter weight thereof and this relationship is referred to as a liter weight parameter.

FIG. 4 is a simplified schematic showing of certain components comprised in recorder device 142 and shows the manner in which sensing unit 132 and the thermocouples 144 and 148 are associated therewith. In FIG. 4, recorder device 142 is indicated by a broken line 142. There is provided a rotatable shaft 200 having a gear 202 rigidly secured thereto and adapted to be driven in either direction by a worm gear 204 which is driven by a null balance servo motor 206 whenever the latter motor receives an appropriate signal from an amplifier 208 which is connected to the motor by a cable 210. The shaft 200 is adapted to move a movable contact finger 212 of an instrument balance slidewire 214, to move a movable contact finger 216 of a control output slidewire 218, and to move a movable dial indicator 220. Thermocouples 144 and 148 are connected in series with each other between amplifier 208 and a terminal 222 on instrument balance slidewire 214. Terminal 222 is also connected to a lead wire 224 from sensing unit 132 and another terminal 226 on instrument balance slidewire 214 is connected to a lead wire 228 from sensing unit 132. Movable contact finger 212 of instrument balance slidewire 214 is connected by a lead wire 230 to amplifier 208.

Recorder device 142 is adapted to receive the rectified and filtered output signal from sensing unit 132 and compare it to the output signal from thermocouples 144 and 148 measuring the ratio between them. Control output slidewire 214 and contact finger 212 of recorder device 142 are preset so that as long as a predetermined ratio exists between the two input signals from thermocouples 144 and 148 and sensing unit 132, no output signal is generated by the bridge circuit wherein they are contained. However, in the event that either or both of the input signals vary to unbalance the bridge circuit, thereby indicating a deviation from the predetermined ratio, a signal is sent to amplifier 208, amplified thereby, and causes rotation of null balance servo motor 206 in the appropriate direction. Operation of motor 206 causes rotation of shaft 200 and movement of contact finger 212 until bridge balance is restored. However, as shaft 200 rotates it also causes movement of contact finger 216 and generation of an output signal through cable 143 which comprises conductor wires 143a, 143b and 143c which are connected respectively to movable contact finger 216 and the end terminals of control output slidewire 218. Simultaneously, indicator 220 is driven to a position corresponding to the new ratio. As will be understood, control output slidewire 218 and its contact finger 216 of recorder device 142 are preset so that the predetermined selected ratio corresponds to a desired liter weight parameter of the clinker. The control output slidewire signal from recorder device 142 is available through cable 143 to control unit 145 which is connected by a cable 150 to a combination rheostat and rheostat drive 152 similar to combination unit 128 hereinbefore described.

The output signal from recorder device 142 is transmitted to control unit 145 wherein it is translated into a form useful to operate combination unit 152 to cause positioning of the rheostat of the latter unit and thereby effect changes in the speed of the motor to which it is connected. In practice, the rheostat of combination unit 152 is usually connected through the motor controller into the circuit of the field windings of the motor which is to be controlled, if such motor is a D.C. motor.

FIG. 3 discloses an arrangement wherein the rheostat of combination unit 152 is connected by cable 154 to motor controller 28 for coal feeder motor 26. In this arrangement, the signal representing liter weight parameter is used to control the amount of fuel being supplied to kiln burner nozzle 15.

Thus, if there is an indication in the form of an electrical signal that the liter weight parameter is low, i.e., that poor quality clinker is being produced, then motor 26 speeds up to supply more fuel to heat the kiln. An opposite indication results in reducing the fuel supply.

FIG. 5 discloses an arrangement wherein the rheostat of combination unit 152 is connected by a cable 156 to motor controller 13 for kiln motor 11. In this arrangement, the signal representing liter weight parameter is used to control the rotational speed of kiln 10. Thus, if there is an indication in the form of an electrical signal that the liter weight parameter is low, i.e., that poor quality clinker is being produced, the motor 11 slows down kiln 10 to subject the material therein to heat for a longer period of time. An opposite indication results in speedup of rotation of kiln 10.

Figures 6, 7:
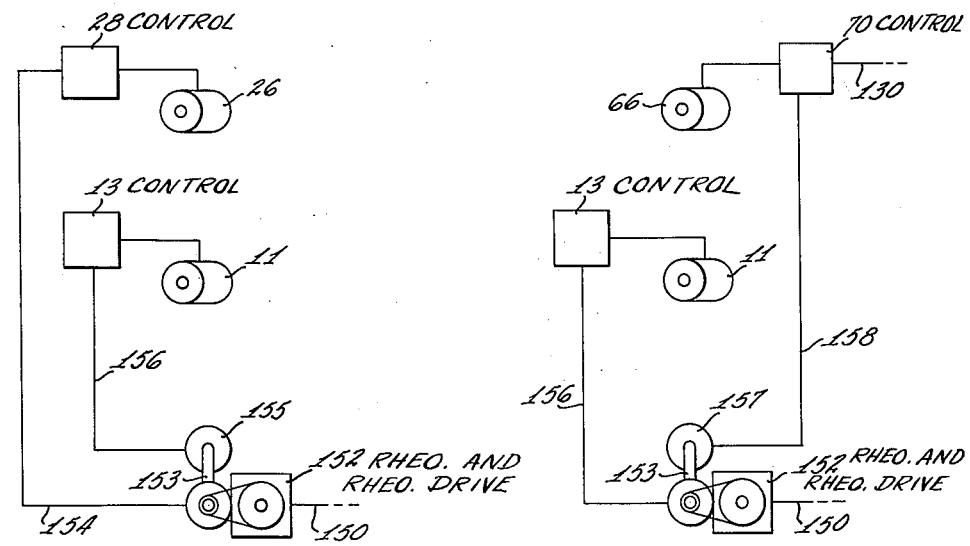

FIG. 6 discloses an arrangement wherein the rheostat of combination unit 152 is provided with a shaft 153 which connects to another rheostat 155. The rheostat of combination unit 152 is connected by cable 154 to controller 28 for coal feeder motor 26. Rheostat 155 is connected by a cable 156 to controller 13 for kiln motor 11. In this arrangement, the signal representing liter weight parameter is used to control both the amount of fuel being supplied to kiln burner nozzle 15 and the rotational speed of kiln 10. Thus, if there is an indication in the form of an electrical output signal that the liter weight parameter is low, i.e., that poor quality clinker is being produced, then motor 26 speeds up to supply more fuel to heat kiln 10 and motor 11 slows down kiln 10 to subject the material therein to heat for a longer period of time. An opposite indication results in reduction of the amount of fuel being supplied and speedup of rotation of kiln 10.

FIG. 7 discloses an arrangement wherein the rheostat of combination unit 152 is provided with a shaft 153 which connects to another rheostat 157. The rheostat of combination unit 152 is connected by cable 156 to controller 13 for kiln motor 11. Rheostat 157 is connected by a cable 158 to controller 70 for conveyer motor 66. In this arrangement, the signal representing liter weight parameter is used primarily to control the speed of rotation of kiln 10 and simultaneously to provide a stabilizing adjustment in the speed of cooler conveyer 40. Since a change in kiln rotation speed will immediately effect a change in kiln discharge rate, maintenance of a constant bed of clinker on grate 42 can be facilitated by anticipating all or part of the speed correction required for conveyer 40. Rather than wait for the correction to be introduced after gamma radiation detector 112 senses a deviation, the correction is introduced into controller 70 by rheostat 157 to regulate the speed of motor 66 before any deviation in bed depth occurs or as it is occurring. Thus, in the event of an indication in the form of an electrical signal that the liter weight parameter is low, i.e., that poor quality clinker is being produced, then motor 11 is slowed down to lengthen the time the clinker remains in the kiln subjected to heat. Since slowing the kiln will immediately decrease its discharge rate, the arrangement disclosed in FIG. 7 permits automatic anticipation of at least part of the slowdown required in the speed of conveyer 40 to stabilize the level of clinker on grate 42. An indication that liter weight parameter is high results in a speedup of kiln rotation and conveyer action.

Figure 8:
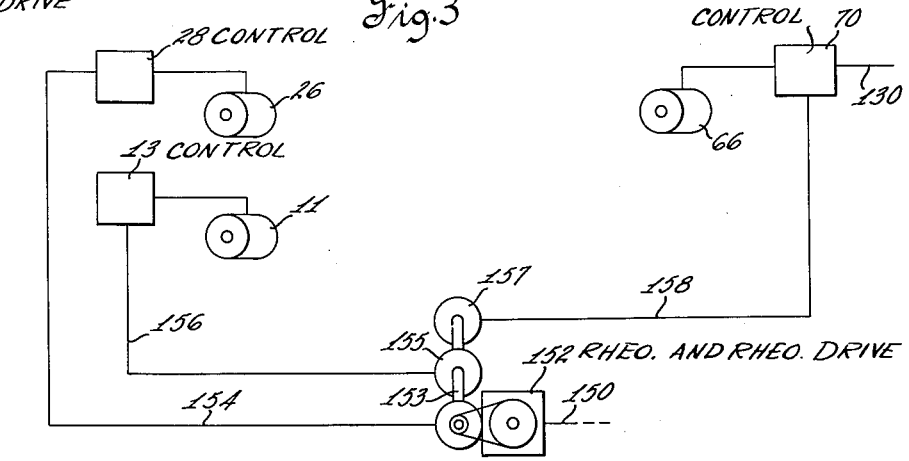
FIGS. 5, 6, 7 and 8 are views of modifications of the control system shown in FIG. 3.

FIG. 8 discloses an arrangement wherein the rheostat of combination unit 152 is provided with a shaft 153 which connects to rheostats 155 and 157. The rheostat of combination unit 152 is connected by cable 154 to controller 28 for coal feeder motor 26. The rheostat 155 is connected by cable 156 to controller 13 for motor 11. The rheostat 157 is connected by cable 158 to controller 70 for motor 66. In this arrangement, the signal representing liter weight parameter is used to control fuel supply, kiln speed and simultaneously to provide a stabilizing adjustment in the speed of cooler conveyer 40. Thus, an indication in the form of an electrical signal that the liter weight parameter is low results in a speedup of motor 26 to supply more fuel to the kiln and a slowdown of motor 11 to slow kiln rotation to subject the material therein to heat for a longer period of time. As explained hereinbefore in connection with FIG. 7, a change in kiln speed is accompanied by an anticipatory change in the speed of cooler conveyer motor 66. An indication that liter weight parameter is high results in a decrease in the amount of fuel being supplied, an increase in the speed of kiln rotation and an anticipatory speedup in conveyer speed.

It is to be understood that the signal representing liter weight parameter can be utilized to control other aspects of the operation of the kiln and its auxiliary apparatus, if such is desirable.

Having now particularly described and ascertained the nature of my said invention and the manner in which it is to be performed, I declare that what I claim is:

1. In a control system for a kiln and its auxiliary apparatus, in combination, kiln means for heat treating and discharging hot material, the heat release sustaining ability of said hot material being indicative of its quality, cooler conveyer means onto which said kiln means discharges said hot material for cooling and conveying, means for measuring the quantity of hot material being conveyed and for providing an output signal related thereto, means for supplying coolant to said hot material being conveyed, means for measuring the temperature of said coolant after it has absorbed heat from said hot material and for providing an output signal related thereto, and means for relating the two aforesaid output signals and for providing a control signal based on such relationship which represents the heat release sustaining ability of said hot material to afford an indication of its quality.

2. The combination according to claim 1 wherein said means for providing a control signal is adapted to regulate heat treating of the hot material within said kiln means.

3. In a control system for a kiln and its auxiliary apparatus, in combination, a kiln for heat treating and discharging hot material, the heat release sustaining ability of said hot material being indicative of its quality, means for regulating the rotational speed of said kiln, means for regulating the heat supplied to said kiln, cooler conveyer means onto which said kiln discharges said hot material for cooling and conveying, means for measuring the quantity of hot material being conveyed and for providing an output signal related thereto, means for supplying coolant to said hot material being conveyed, means for measuring the temperature of said coolant after it has absorbed heat from said hot material and for providing an output signal related thereto, and means for relating the two aforesaid output signals and for providing a control signal based on such relationship which represents the heat release sustaining ability of said hot material to afford an indication of its quality.

4. The combination according to claim 3 wherein said means for providing a control signal is adapted to control the means for regulating the heat supplied to said kiln.

5. The combination according to claim 3 wherein said means for providing a control signal is adapted to control the means for regulating the rotational speed of said kiln.

6. The combination according to claim 3 wherein said means for providing a control signal is adapted to control both the means for regulating the heat supplied to said kiln and the means for regulating the rotational speed of said kiln.

7. In a control system for a kiln and its auxiliary apparatus in combination, a kiln for heat treating and discharging variable quantities of hot material, the heat release sustaining ability of said hot material being indicative of its quality, means for regulating the rotational speed of said kiln, means for regulating the heat supplied to said kiln, cooler conveyer means onto which said kiln discharges variable quantities of said hot material for cooling and conveying, means for regulating the conveying speed of said cooler conveyer, means for measuring bed depth of said hot material on said cooler conveyer and for controlling the means for regulating the conveying speed of said cooler conveyer to maintain bed depth constant despite variations in kiln output, means including means for measuring the speed of said conveyer to ascertain the quantity of hot material being conveyed and for providing an output signal related thereto, means for supplying coolant to said hot material being conveyed, means for measuring the temperature of said coolant after it has absorbed heat from said hot material and for providing an output signal related thereto, and means for relating the two aforesaid output signals and for providing a control signal based on such relationship which represents the heat release sustaining ability of said hot material to afford an indication of its quality.

8. The combination according to claim 7 wherein said means for providing a control signal is adapted to control the means for regulating the rotational speed of said kiln and to control the means for regulating the conveying speed of said cooler conveyer means to anticipate a variation in kiln output as kiln speed changes.

9. The combination according to claim 7 wherein said means for providing a control signal is adapted to control the means for regulating the heat supplied to said kiln, to control the means for regulating the rotational speed of said kiln and to control the means for regulating the conveying speed of said cooler conveyer means to anticipate a variation in kiln output as kiln speed changes.

10. In a control system for a kiln and its auxiliary apparatus, in combination, a kiln for heat treating and discharging variable quantities of hot material, the heat release sustaining ability of said hot material being indicative of its quality, means for regulating the rotational speed of said kiln, means for regulating the heat supplied to said kiln, cooler conveyer means onto which said kiln discharges variable quantities of said hot material and which forms said hot material into a moving bed of predetermined width, means for regulating the conveying speed of said cooler conveyer, means for measuring bed depth of said hot material on said cooler conveyer, said means comprising means for directing a beam of radiation through and over said bed of hot material and means for quantitatively detecting radiation so transmitted to render an indication of bed depth, means for comparing said rendered indication with a desired depth indication to provide an error signal having a magnitude proportional to the difference therebetween, means responsive to said error signal for controlling the means for regulating the conveying speed of said cooler conveyer to effect return of bed depth to predetermined depth, means to ascertain the quantity of hot material being conveyed by said conveyer, said means comprising inductive means for measuring the speed of said conveyer and for providing an electrical output signal related thereto, means for supplying cooling air to said hot material being conveyed, means including thermocouple means for measuring the temperature of said cooling air after it has absorbed heat from said hot material and for providing an electrical signal related thereto, and means for relating the two aforesaid electrical output signals in a ratio and for comparing said ratio with a desired ratio indication to provide an error signal having a magnitude proportional to the difference therebetween, said error signal representing the heat release sustaining ability of said hot material to afford an indication of its quality.

11. The combination according to claim 10 wherein means are provided to receive said error signal and to adapt said error signal to control the means for regulating the rotational speed of said kiln and to control the means for regulating the conveying speed of said cooler conveyer means to anticipate a variation in kiln output as kiln speed changes.

12. The combination according to claim 10 wherein means are provided to receive said error signal and to adapt said error signal to control the means for regulating the heat supplied to said kiln, to control the means for regulating the rotational speed of said kiln and to control the means for regulating the conveying speed of said cooler conveyer means to anticipate a variation in kiln output as kiln speed changes.

13. In a control system for a kiln and its auxiliary apparatus, in combination, a kiln for heat treating and discharging variable quantities of material, conveyer means onto which said kiln discharges variable quantities of said material for conveying, means for regulating the conveying speed of said conveyer, means including radioactive means for measuring bed depth and density of said material on said conveyer and for controlling the means for regulating the conveying speed of said conveyer to maintain bed depth and density constant despite variations in kiln output, and means including means for measuring the speed of said conveyer to ascertain the quantity of material being conveyed and for providing an output signal related thereto.

14. In a control system for a kiln and its auxiliary apparatus, in combination, a kiln for heat treating and discharging variable quantities of material, conveyer means onto which said kiln discharges variable quantities of said material and which forms said material into a moving bed of predetermined width, means including radioactive means for maintaining said moving bed of material at predetermined depth and density on said conveyer means despite variations in kiln output by effecting changes in the speed at which said conveyer means moves said material, and means for providing an indication of the speed at which said conveyer means moves said material, said indication being an index of the quantity of material being discharged by said kiln.

15. In a system for determining the rate of production of a kiln having a variable output, in combination, a kiln for continuously processing and discharging variable quantities of material, conveyer means onto which said material is discharged by said kiln and which forms said material into a moving bed of predetermined constant width, means for maintaining said moving bed of material at a predetermined constant depth and density on said conveyer means despite variations in kiln output, said maintaining means comprising radioactive means adapted to measure the depth and density of said bed of material, for quantitatively detecting variations from said predetermined depth and density and for providing an error signal related thereto, means responsive to said error signal for effecting changes in the rate of speed at which said conveyer means moves said material until said depth of material returns to said predetermined depth and density, and means for sensing and rendering an indication of the rate of speed at which said conveyer means moves said material, said indication of the rate of speed being proportioned to the rate of production of said kiln.

16. In a system for determining the rate of production of a kiln having a variable output, in combination, a kiln for continuously processing and discharging variable quantities of material, conveyer means onto which said material is discharged by said kiln and which forms said material into a moving bed of predetermined width, means for maintaining said moving bed of material at a pretermined depth and density on said conveyer means despite variations in kiln output, said maintaining means comprising means for directing a beam of radiation through and over said bed of material and means for quantitatively detecting radiation so transmitted to render an indication of the depth and density of said bed of material, means for comparing said rendered indication with a desired depth and density indication to provide an error signal having a magnitude proportional to the difference therebetween, means responsive to said error signal for effecting changes in the rate of speed at which said conveyer means moves said material until said depth and density of material returns to said predetermined depth and density, and means for sensing and rendering an indication of the rate of speed at which said conveyer means moves said material, said indication of the rate of speed being an index to the rate of production of said kiln.

References Cited in the file of this patent
UNITED STATES PATENTS
2,084,976    Puerner _____ June 22, 1937